United States Patent
Chen

(10) Patent No.: US 11,349,742 B2
(45) Date of Patent: May 31, 2022

(54) MODEM AND COMMUNICATION METHOD

(71) Applicant: PEGATRON CORPORATION, Taipei (TW)

(72) Inventor: Wen-Ming Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 53 days.

(21) Appl. No.: 16/719,601

(22) Filed: Dec. 18, 2019

(65) Prior Publication Data

US 2020/0252352 A1 Aug. 6, 2020

(30) Foreign Application Priority Data

Jan. 31, 2019 (TW) ................................ 108103928

(51) Int. Cl.
| | |
|---|---|
| *H04L 43/10* | (2022.01) |
| *H04L 12/12* | (2006.01) |
| *H04L 49/25* | (2022.01) |
| *H04L 49/552* | (2022.01) |

(52) U.S. Cl.
CPC .............. *H04L 43/10* (2013.01); *H04L 12/12* (2013.01); *H04L 49/252* (2013.01); *H04L 49/552* (2013.01)

(58) Field of Classification Search
CPC ....................................................... H04L 43/10
See application file for complete search history.

(56) References Cited

U.S. PATENT DOCUMENTS

| | | | |
|---|---|---|---|
| 6,510,162 B1 | 1/2003 | Fijolek et al. | |
| 7,873,377 B1 | 1/2011 | Cocos | |
| 10,412,643 B1* | 9/2019 | Liu | H04W 36/0088 |
| 2008/0148379 A1* | 6/2008 | Xu | H04L 63/029 |
| | | | 726/11 |
| 2012/0213259 A1* | 8/2012 | Renken | H04N 21/6168 |
| | | | 375/222 |
| 2017/0026905 A1* | 1/2017 | Denboer | H04W 76/10 |
| 2017/0034807 A1* | 2/2017 | Lumbatis | H04L 47/122 |

FOREIGN PATENT DOCUMENTS

| | | |
|---|---|---|
| CN | 102119564 | 5/2014 |
| CN | 103812687 | 12/2017 |
| CN | 107852587 | 3/2018 |

OTHER PUBLICATIONS

"Search Report of Europe Counterpart Application", dated Jun. 30, 2020, p. 1-p. 8.

* cited by examiner

*Primary Examiner* — Jason E Mattis
(74) *Attorney, Agent, or Firm* — J.C. Patents

(57) ABSTRACT

The present disclosure provides a modem and a communication method. The modem includes a processor. The processor scans a first network channel of a plurality of network channels provided by the modem. The processor enters an idle scan time period and performs a packet forwarding operation during the idle scan period upon completion of scanning the first network channel. The processor scans a second network channel of the plurality of the network channels after the scanning idle period.

8 Claims, 3 Drawing Sheets

MODEM AND COMMUNICATION METHOD

CROSS-REFERENCE TO RELATED APPLICATION

This application claims the priority benefit of Taiwan application serial no. 108103928, filed on Jan. 31, 2019. The entirety of the above-mentioned patent application is hereby incorporated by reference herein and made a part of this specification.

BACKGROUND

Technical Field

The present disclosure relates to a modem and a communication method, and in particular, to a modem and a communication method that can respond to a packet when a channel is scanned.

Related Art

Downstream scan by a cable modem is a continuous and time-consuming operation, because it is required to check, in channels one by one, whether there is a downstream channel that can be locked. In addition, the downstream scan occupies a long period of time due to a large number of channels. A processor (for example, a CPU) keeps running during the long period of time for the downstream scan. Therefore, in a same time period, if another operation that causes a load to the processor is performed, efficiency may be reduced because the processor cannot bear the two operations at the same time.

On the other hand, a packet forwarding operation also occupies the processor. If a ping test is performed when the cable modem is performing downstream scan, a ping packet may be lost because the processor cannot bear the two operations at the same time. For example, if a client sends an Internet Control Message Protocol (ICMP) packet to the cable modem when the cable modem is performing the downstream scan, the client cannot obtain a response because the processor of the cable modem does not have sufficient computing power, thereby observing a packet loss. Therefore, those skilled in the art shall be committed to improving the response to the packet when the scanning channels.

SUMMARY

The present disclosure provides a modem and a communication method that can respond to a packet when scanning a channel.

The present disclosure provides a modem, including a processor. The processor is configured to: scan a first network channel of a plurality of network channels provided by the modem; upon completion of scanning the first network channel, enter an scanning idle period and perform a packet forwarding operation during the scanning idle period; and scan a second network channel of the plurality of the network channels after the scanning idle period.

The present disclosure provides a communication method suitable for the modem. The modem includes a processor. The communication method includes: scanning, by the processor of the modem, a first network channel of a plurality of network channels provided by the modem; entering, by the processor, an scanning idle period and performing a packet forwarding operation upon completion of scanning the first network channel; and scanning, through the processor, a second network channel of the plurality of the network channels after the scanning idle period.

Based on the foregoing description, according to the modem and the communication method of the present disclosure, the packet forwarding operation may be performed during the scanning idle period between scanning the first network channel and the second network channel by the processor of the modem, so that a client does not observe a packet loss when the processor scans the channel.

In order to make the aforementioned and other objectives and advantages of the present disclosure comprehensible, embodiments accompanied with figures are described in detail below.

DETAILED DESCRIPTION

Figure 1:
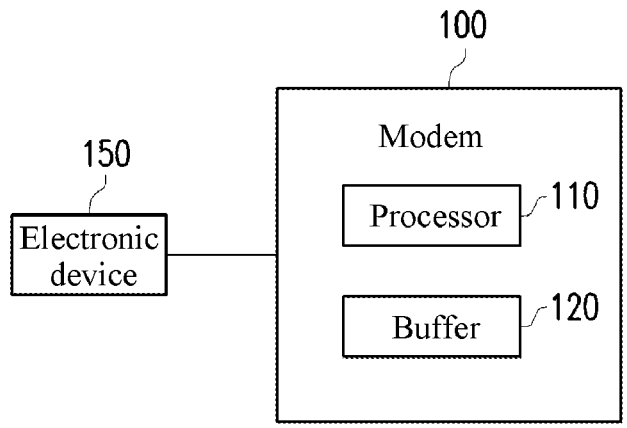
FIG. 1 is a block diagram of a modem according to an embodiment of the present disclosure.

FIG. 1 is a block diagram of a modem according to an embodiment of the present disclosure. Referring to FIG. 1, a modem 100 includes a processor 110 and a buffer 120, in which the processor 110 may be coupled to the buffer 120. The modem 100 is, for example, a cable modem. The processor 110 may be configured to scan a plurality of network channels provided by the modem 100. For example, the processor 110 is a microprocessor control unit (MCU) or other similar elements. The buffer 120 may be configured to store packets. For example, the buffer 120 may be a synchronous dynamic random-access memory (SDRAM) or other similar elements.

As shown in FIG. 1, the modem 100 is coupled to an electronic device 150, and the electronic device 150 may communicate with the modem 100 through a wired or wireless network. The electronic device 150 is, for example, a personal computer, a tablet computer, a smart phone or other similar elements of a client. In some other embodiments, the modem 100 is coupled to a plurality of electronic devices 150.

In an embodiment, the processor 110 is configured to scan the plurality of the network channels (e.g. wired or wireless network channels) provided by the modem 100 and perform a packet forwarding operation. The packet forwarding operation includes responding to a packet from the client, in which the packet may include a ping packet, but the present disclosure is not limited thereto.

In some embodiments, if the modem 100 receives a packet when the processor 110 performs scanning the network channels, the packet may be temporarily stored in the buffer 120, and the processor 110 performs the packet forwarding operation with the received packet in a scanning idle period. In this way, even if a user transmits a packet to the modem 100 by the electronic device 150 when the processor 110 of the modem 100 scans the network channel, the processor 110 of the modem 100 may also first temporarily store the received packet in the buffer 120, and respond to the received packet until a calculation resource of the processor 110 is used for the packet forwarding operation (that is, in the scanning idle period).

Figure 2A:
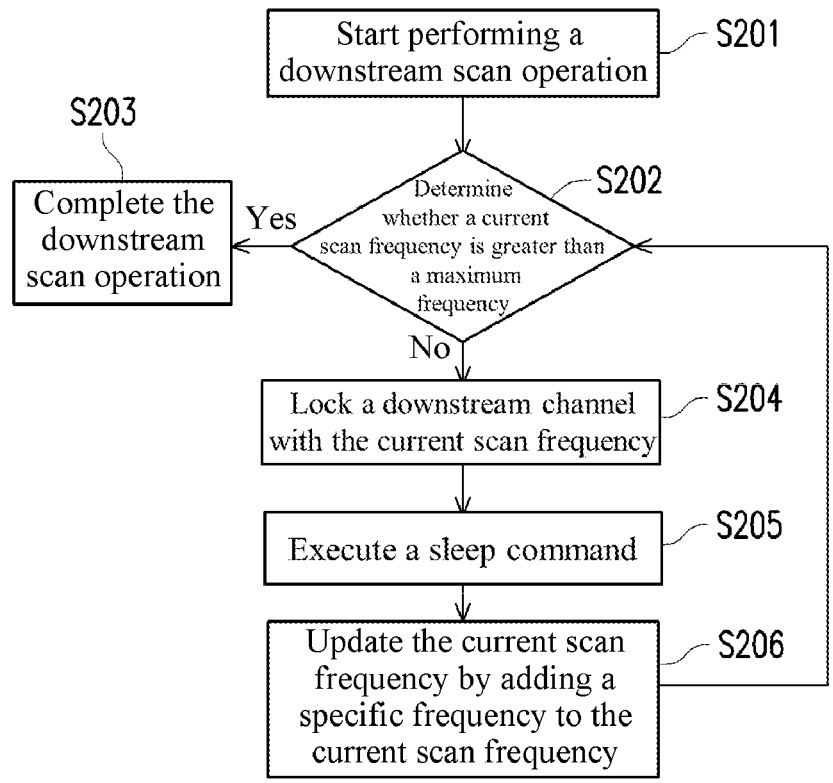
FIG. 2A is a flowchart of a downstream scan operation according to an embodiment of the present disclosure.
Figure 2B:
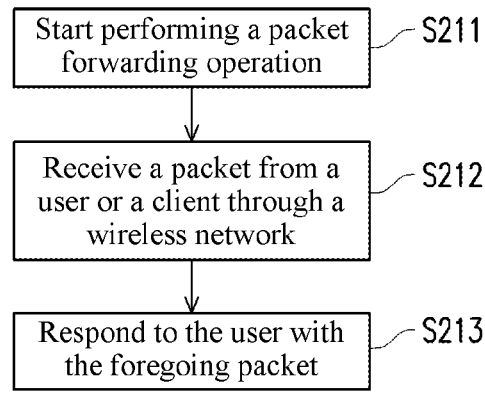
FIG. 2B is a flowchart of a packet forwarding operation according to an embodiment of the present disclosure.
Figure 2C:
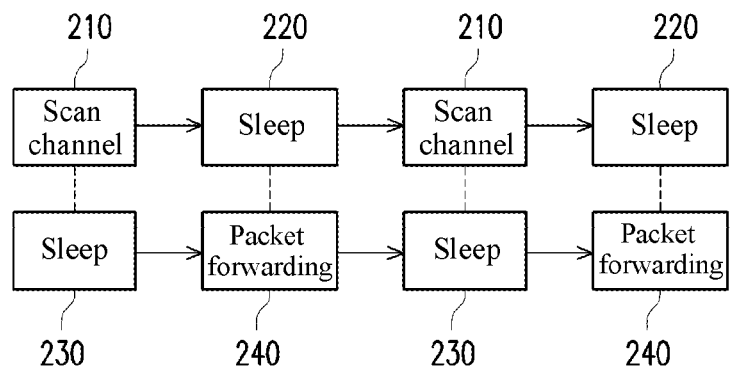
FIG. 2C is a schematic diagram of interactive execution of a downstream scan operation and a packet forwarding operation according to an embodiment of the present disclosure.

FIG. 2A is a flowchart of a downstream scan operation according to an embodiment of the present disclosure. FIG. 2B is a flowchart of a packet forwarding operation according to an embodiment of the present disclosure. FIG. 2C is a schematic diagram of interactive execution of a downstream scan operation and a packet forwarding operation according to an embodiment of the present disclosure.

References are made to FIG. 2A and FIG. 2C, first, in step S201, a modem 100 starts performing a downstream scan operation upon being enabled.

Next, in step S202, whether a current scan frequency is greater than a maximum frequency is determined.

If the current scan frequency is greater than the maximum frequency, step S203 is performed to end the downstream scan operation.

If the current scan frequency is less than or equal to the maximum frequency, step S204 is performed to lock a downstream channel (e.g. a scan channel 210 in FIG. 2C) with the current scan frequency.

In this embodiment, the processor 110 stops the downstream scan operation when the current scan frequency is greater than the maximum frequency. In another embodiment, the processor 110 may also stop the downstream scan operation when an available downstream channel is found.

Next, in step S205, a sleep command (e.g. a sleep 220 in FIG. 2C) is executed. For example, sleep from 0.01 second to 0.05 second is performed.

In step S206, the current scan frequency is updated by adding a specific frequency to the current scan frequency. That is, moving to the next downstream channel. The foregoing specific frequency is, for example, 6 MHz, but the present disclosure is not limited thereto.

It should be noted that the packet forwarding operation (e.g. packet forwarding 240 in FIG. 2C) in FIG. 2B may be performed during executing the sleep command in the downstream scanning operation (e.g. sleep 220 in FIG. 2C) in step S205.

Referring to FIG. 2B and FIG. 2C together, in step S211, a packet forwarding operation is started, that is, the packet forwarding can be started during a period of packet forwarding 240 in FIG. 2C.

In step S212, a packet from a user or a client is received through a wireless network, that is, the packet is received during the period of the packet forwarding 240 in FIG. 2C.

In step S213, the user is responded with the foregoing packet, that is, a packet response is performed during the period of the packet forwarding 240 in FIG. 2C.

Referring to FIG. 2A to FIG. 2C, a step S204 of FIG. 2A that the downstream channel is locked with a current scan frequency corresponds to a scan channel 210 in FIG. 2C. A step S205 of FIG. 2A that the sleep command is executed corresponds to the sleep 220 in FIG. 2C. When the step S205 of FIG. 2A is performed, the downstream scan operation enters a sleep state, and the packet forwarding operation in FIG. 2B corresponds to the packet forwarding 240 in FIG. 2C. When the downstream scan operation in FIG. 2A is locking the downstream channel with the current scan frequency in step S204, the packet forwarding operation in FIG. 2B enters a sleep 230 state in FIG. 2C.

In other words, in FIG. 2C, when the processor 110 scans channel 210 in the downstream scan operation, the packet forwarding operation correspondingly executes sleep 230, so that the processor 110 is not affected by an incoming packet while scanning a channel. Similarly, when the sleep 220 is executed in the downstream scan operation, the packet forwarding operation correspondingly executes packet forwarding 240. In other words, the packet forwarding 240 is performed during a short time interval (that is, the sleep 220) between operations of two scan channels 210. Therefore, a ping packet transmitted by the user may be responded without affecting efficiency of the downstream scan operation.

It should be noted that after the processor 110 executes the sleep command, execution data (e.g. the current scan frequency) of the downstream scan operation may be retained in an operating system of the modem 100, and the processor 110 stops executing the downstream scan operation.

Although packet receiving and forwarding performed during the packet forwarding 240 is described in the foregoing embodiment, the present disclosure is not limited thereto. In another embodiment, the packet can be also received and temporarily stored in the buffer 120 during the sleep 230, and the packet forwarding operation is performed using resources of the processor 110 during the packet forwarding 240.

Figure 3:
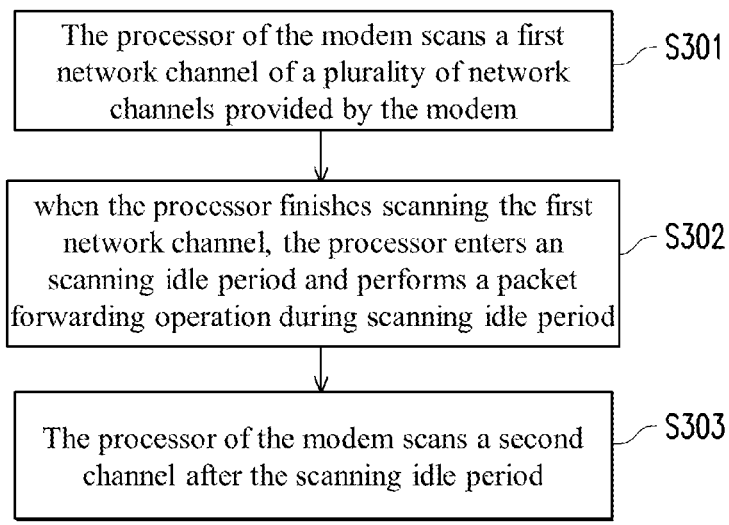
FIG. 3 is a flowchart of a communication method according to an embodiment of the present disclosure.

FIG. 3 is a flowchart of a communication method according to an embodiment of the present disclosure. Referring to FIG. 1 and FIG. 3, in step S301, the processor 110 of the modem 100 scans a first network channel of a plurality of network channels provided by the modem 100. In some embodiments, the plurality of network channels include a plurality of frequency bands located between 91 MHz and 857 MHz, and an interval between the frequency bands in the plurality of network channels is 6 MHz. For example, the first network channel may be 91 MHz, and the second network channel may be 97 MHz.

In step S302, when the processor 110 finishes scanning the first network channel, the processor 110 enters a scanning idle period and performs a packet forwarding operation during the scanning idle period.

In step S303, the processor 110 of the modem 100 scans a second network channel after the scanning idle period.

Figure 4:
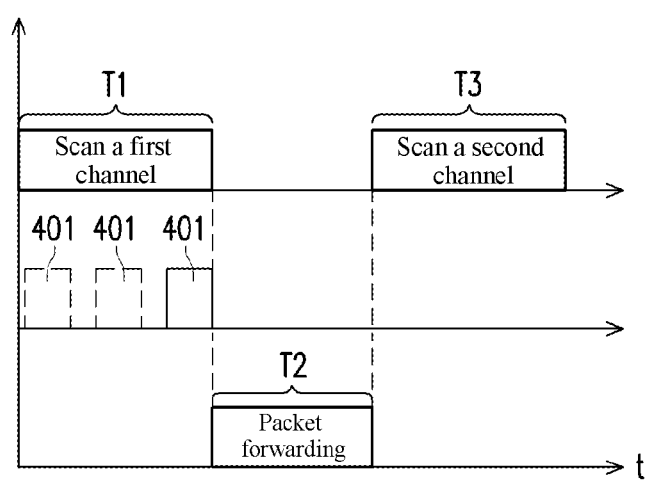
FIG. 4 is a schematic diagram of a communication method according to an embodiment of the present disclosure.

FIG. 4 is a schematic diagram of a communication method according to an embodiment of the present disclosure. Referring to FIG. 1 and FIG. 4, a lateral axis in FIG. 4 represents a time axis t. A time slot T2 for packet forwarding is between a time slot T1 for scanning a first channel and a time slot T3 for scanning a second channel. When a modem 100 receives a packet 401 in the time slot T1, the packet 401 is first temporarily stored in a buffer 120 until entering a scanning idle period (that is, the time slot T2 for the packet forwarding). Then, the packet 401 is taken out from the buffer 120, and the processor 110 performs a packet response operation in the time slot T2. The time slots T1 and T3 are, for example, between one second and two seconds, and the time slot T2 is, for example, between 0.01 seconds to 0.05 seconds. Because the time slot T2 is fairly short relative to the time slot T1/T3 for scanning the network channel, a time for frequency scanning by the modem 100 may not be improperly prolonged.

In summary, according to the modem and the communication method of the present disclosure, the packet forwarding operation may be performed during the scanning idle period between scanning of the first network channel and scanning of the second network channel by the processor of the modem, so that the client does not receive a message for a packet loss when the processor scans the channel. In addition, the packet received by the modem when scanning the network channel may also be first temporarily stored in the buffer, and a packet response operation is performed until during the scanning idle period.

Although the present disclosure has been disclosed above through the embodiments, the embodiments are not intended to limit the present disclosure. Any person of ordinary skill in the art can make some variations or modifications without departing from the spirit and scope of the present disclosure. Therefore, the protection scope of the present disclosure shall be subject to the appended claims.

What is claimed is:

1. A modem, comprising:
a processor configured to:
perform a downstream scan operation to scan a first network channel of a plurality of network channels via a cable interface;
enter a scanning idle period upon completion of scanning the first network channel and perform a packet forwarding operation via a wired interface or a wireless interface during the scanning idle period, wherein the packet forwarding operation comprising responding to a ping packet from a client; and
perform the downstream scan operation to scan a second network channel of the plurality of the network channels via the cable interface after the scanning idle period.

2. The modem according to claim 1, further comprising a buffer, wherein the processor receives the ping packet when scanning the first network channel, the ping packet is temporarily stored in the buffer, and the processor performs the packet forwarding operation corresponding to the ping packet during the scanning idle period.

3. The modem according to claim 1, wherein the processor executes a sleep command within the downstream scan operation to enter the scanning idle period.

4. The modem according to claim 3, wherein after the processor executes the sleep command, execution data of the downstream scan operation is retained in an operating system, and the processor stops performing the downstream scan operation.

5. The modem according to claim 1, wherein a length of the scanning idle period is between 0.01 second and 0.05 seconds.

6. The modem according to claim 1, wherein the network channels are located at different frequency bands.

7. A communication method suitable for a modem, the modem comprising a processor, and the communication method comprising:
performing, by the processor, a downstream scan operation to scan a first network channel of a plurality of network channels via a cable interface;
entering, by the processor, a scanning idle period upon completion of scanning the first network channel, and performing a packet forwarding operation via a wired interface or a wireless interface during the scanning idle period, wherein the packet forwarding operation comprising responding to a ping packet from a client; and
performing, by the processor, the downstream scan operation to scan a second network channel of the plurality of the network channels via the cable interface after the scanning idle period.

8. The communication method according to claim 7, further comprising:
receiving, by the processor, the ping packet when the first network channel is scanned, and temporarily storing the ping packet in a buffer; and
performing, by the processor, the packet forwarding operation corresponding to the ping packet during the scanning idle period.

* * * * *